(12) United States Patent
Katz et al.

(10) Patent No.: US 8,380,930 B2
(45) Date of Patent: Feb. 19, 2013

(54) REFRESHING CACHED DATA BASED ON CONTENT IDENTIFIER MAP

(75) Inventors: Gregory Talbott Katz, Seattle, WA (US); Yury Polyakovsky, Bellevue, WA (US)

(73) Assignee: Disney Enterprises, Inc., Burbank, CA (US)

(*) Notice: Subject to any disclaimer, the term of this patent is extended or adjusted under 35 U.S.C. 154(b) by 720 days.

(21) Appl. No.: 12/349,262

(22) Filed: Jan. 6, 2009

(65) Prior Publication Data
US 2010/0174861 A1  Jul. 8, 2010

(51) Int. Cl.
*G06F 12/00* (2006.01)
*G06F 13/00* (2006.01)
*G06F 13/28* (2006.01)
*G06F 15/173* (2006.01)

(52) U.S. Cl. .......... 711/118; 711/144; 707/999.02; 709/226

(58) Field of Classification Search .......... 711/118, 711/144, E12.022; 707/999.02; 709/226
See application file for complete search history.

(56) References Cited

U.S. PATENT DOCUMENTS

| | | | |
|---|---|---|---|
| 6,591,266 B1 * | 7/2003 | Li et al. | 1/1 |
| 6,799,214 B1 * | 9/2004 | Li | 709/226 |
| 6,889,234 B1 * | 5/2005 | Li et al. | 1/1 |
| 7,228,318 B2 * | 6/2007 | Li et al. | 707/704 |
| 8,037,126 B2 * | 10/2011 | Plamondon | 709/203 |
| 2003/0191812 A1 | 10/2003 | Agarwalla et al. | |
| 2004/0267712 A1 * | 12/2004 | Papanyan et al. | 707/3 |
| 2007/0156965 A1 * | 7/2007 | Sundarrajan et al. | 711/133 |
| 2008/0229024 A1 * | 9/2008 | Plamondon | 711/126 |
| 2009/0138568 A1 * | 5/2009 | Sollicito et al. | 709/215 |

* cited by examiner

*Primary Examiner* — Michael Alsip
(74) *Attorney, Agent, or Firm* — Patterson & Sheridan, LLP

(57) ABSTRACT

A system for refreshing cached data based on content update frequency includes an application/presentation layer coupled to a caching layer, the caching layer including cached content, and a content management system coupled to the application/presentation layer, the content management system configured to provide a content invalidation message to the caching layer informing the caching layer when the cached content is updated.

14 Claims, 3 Drawing Sheets

REFRESHING CACHED DATA BASED ON CONTENT IDENTIFIER MAP

BACKGROUND

In a typical world wide web server application, in which a server device provides data to a client device, such as a personal computer, mobile device, etc., data such as web pages are typically cached in their entirety. Each cached web page or data object is assigned a predetermined time to live (TTL).

Typically, to guarantee that a cached page always contains the most recent and relevant content, the TTL is set to the maximum amount of time that a business, or other entity providing the content, is willing to wait before refreshing the cached page. Typically, this time period is seconds or minutes. However, the content on the page may not change very often, and, as a result, the page is regenerated and cached significantly more frequently than needed. Further, if the content is updated before the TTL limit is reached, the cached page will contain stale content.

Therefore, there is a need for a way of efficiently refreshing a cached web page or other data object as soon as content within that page or object is updated.

SUMMARY

Embodiments of the invention include a system for refreshing cached data based on content update frequency including an application/presentation layer coupled to a caching layer, the caching layer including cached content, and a content management system coupled to the application/presentation layer, the content management system configured to provide a content invalidation message to the caching layer informing the caching layer when the cached content is updated.

Other embodiments are also provided. Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The invention can be better understood with reference to the following figures. The components within the figures are not necessarily to scale, emphasis instead being placed upon clearly illustrating the principles of the invention. Moreover, in the figures, like reference numerals designate corresponding parts throughout the different views.

DETAILED DESCRIPTION

Figure 1:
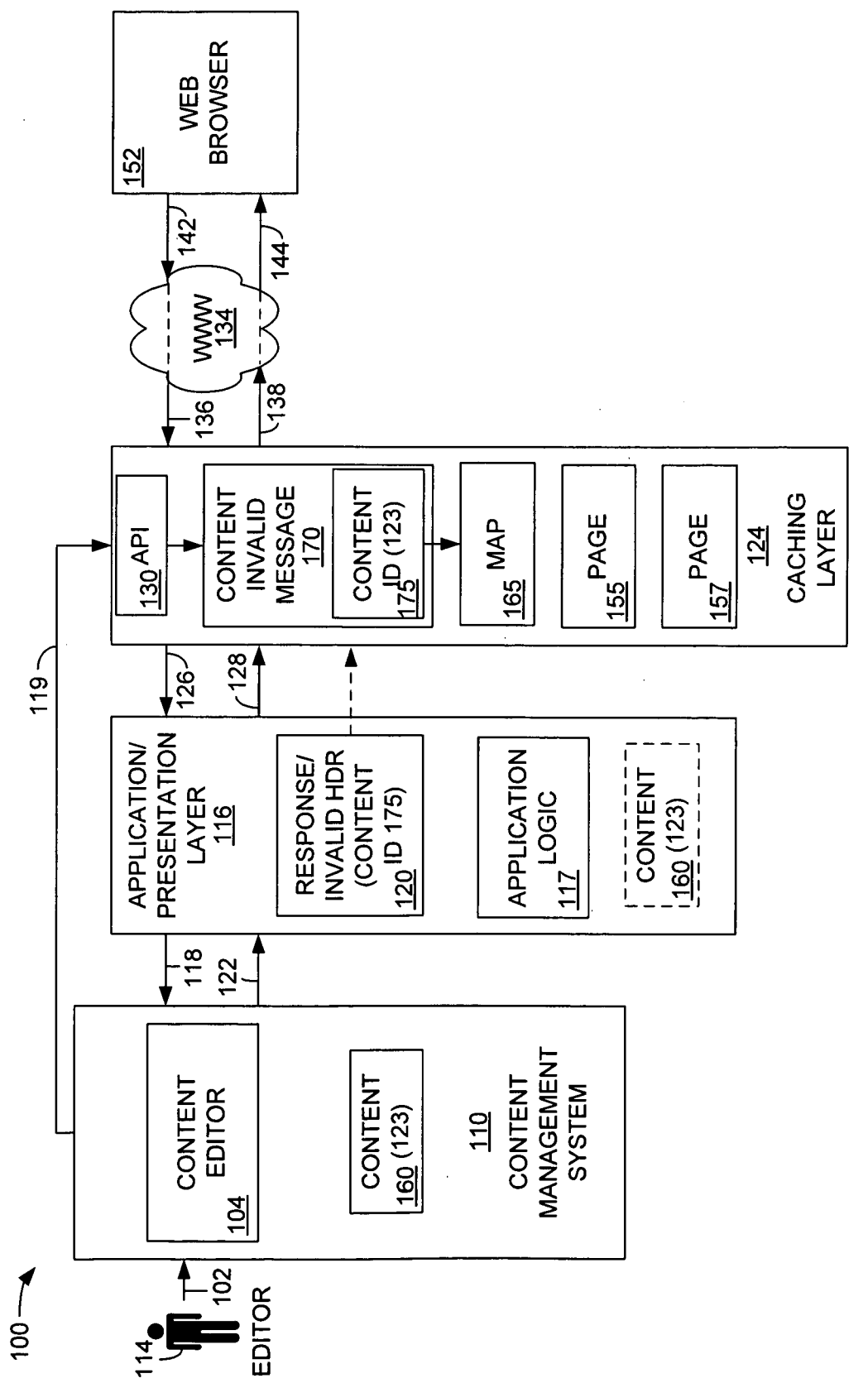
FIG. 1 is a block diagram illustrating an example of a system for refreshing cached data based on content update frequency.

The system and method for refreshing cached data based on content update frequency will be described in the context of delivering information over the world wide web (WWW) to a browser. However, the system and method for refreshing cached data based on content update frequency is applicable to delivering any data having an expiration time-frame to any device. Further, the system and method for refreshing cached data based on content update frequency can deliver wireless application protocol (WAP) data to a mobile device, or can deliver other types of data to a mobile device or to any device, such as a personal computer, home appliance, or any other device.

The system and method for refreshing cached data based on content update frequency can be implemented in hardware, software, or a combination of hardware and software. When implemented in hardware, the system and method for refreshing cached data based on content update frequency can be implemented using specialized hardware elements and logic. When the system and method for refreshing cached data based on content update frequency is implemented in software, the software can be used to control the various components in a device, system and/or network associated with the program. The software can be stored in a memory and executed by a suitable instruction execution system (microprocessor). The hardware implementation of the system and method for refreshing cached data based on content update frequency can include any or a combination of the following technologies, which are all well known in the art: discrete electronic components, a discrete logic circuit(s) having logic gates for implementing logic functions upon data signals, an application-specific integrated circuit having appropriate logic gates, a programmable gate array(s) (PGA), a field programmable gate array (FPGA), etc.

The software for the system and method for refreshing cached data based on content update frequency comprises an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

FIG. 1 is a block diagram illustrating an example of a system for refreshing cached data based on content update frequency. The system for refreshing cached data based on content update frequency 100 includes a content management system 110. The content management system 110 can be any system that is used to manage content that can be delivered to a browser over the world wide web 134. The content management system 110 generally includes a content editor 104 and at least one content object 160. The content object 160 can be any logical unit, including for example, but not limited to, text, images, video, audio, or any combination thereof, that can be used as content on a page. Although shown in FIG. 1 as a single content object 160, there are typically many content objects 160. The content management system 110 also includes many other elements (not shown) that are used to manage content that is delivered over the world wide web 134. However, these elements are not shown for simplicity of illustration. An editor 114 can access the content management system 110 directly over connection 102 to manipulate and update the content object 160.

The content management system 110 is in communication with an application/presentation layer 116 over connections 118 and 122. The connections 118 and 122 are shown as separate directional communication lines, but can also be implemented as a single bi-directional communication line as known in the art. The application/presentation layer 116 includes application logic 117. The application logic 117 can be, for example, a presentation template. The application/presentation layer 116 renders content, such as pages, using the application logic 117 and also renders the content object 160 that is received from the content editor 110, as will be described below. In an embodiment, the application/presentation layer 116 retrieves, or is presented with, the content object 160 from the content management system 110 during execution of business logic that renders a web page. Accordingly, the content object 160 is illustrated using a dotted line in the application/presentation layer 116 to denote that the content object 160 originates in the content management system 110 and is rendered by the application/presentation layer 116.

The application/presentation layer 116 communicates with a caching layer 124 over connections 126 and 128. The connections 126 and 128 are shown as separate directional communication lines, but can also be implemented as a single bi-directional communication line as known in the art. The caching layer 124 is operatively coupled to the world wide web 134 over connections 136 and 138.

The caching layer 124 includes page 155 and page 157, a content identifier 175 and a content identifier/page map 165, also referred to as a map 165. The map 165 associates a content identifier 175 with a page 155 and/or a page 157. For example, the content identifier 175 (identifying content that is referred to arbitrarily as "123") can be mapped to the page 155, for example, "page1.html" and to the page 157, for example, "page2.html." By querying the map 165, the caching layer 124 can determine that the page 155, "page1.html," and the page 157, "page2.html," contain the content object 160 with the identifier "123." This allows the caching layer 124 to expire page 155, "page1.html," and page 157, "page2.html," when a content invalidation message 170 is received having the content identifier 175 which identifies the content "123" in the content object 160.

A web browser 152 is coupled to the world wide web 134 over connections 142 and 144. The connections 136 and 138, and the connections 142 and 144 are similar to the connections 126 and 128 described above. In accordance with an embodiment of the system and method for refreshing cached data based on content update frequency, the content management system is operatively coupled to the caching layer 124 over connection 119. When a logical unit of content identified by a content object 160 is updated, the content management system 110 communicates over connection 119 to the caching layer 124 a content invalidation message 170 containing a content identifier 175. In an embodiment, a content identifier 175 is a unique alpha-numeric character string that has a one-to-one relationship with a content object 160. In some embodiments, there will be multiple content objects 160 and multiple content invalidation messages 170. An example of a content invalidation message 170 can be "/expiredcontent?ID=123." An application program interface (API) 130 receives the content invalidation message 170 and provides it to the caching layer 124.

Prior to serving a particular page, such as, for example, page 155, the caching layer 124 ensures that it has received no content invalidation message 170 for any content object 160 used on the page 155. If the caching layer 124 has received a content invalidation message 170 for one or more of the content objects 160 used on a page, the caching layer 124 requests that the application/presentation layer 116 generate a new page. If the caching layer 124 has not received a content invalidation message for any of the content objects 160 used on a page, the caching layer 124 serves the cached page without requesting that the application/presentation layer 116 generate a new page. This allows pages to be cached until content is actually updated. In cases where pages are frequently accessed and content is frequently updated, the performance gain can be several hundred-fold over conventional caching systems.

Figure 2:
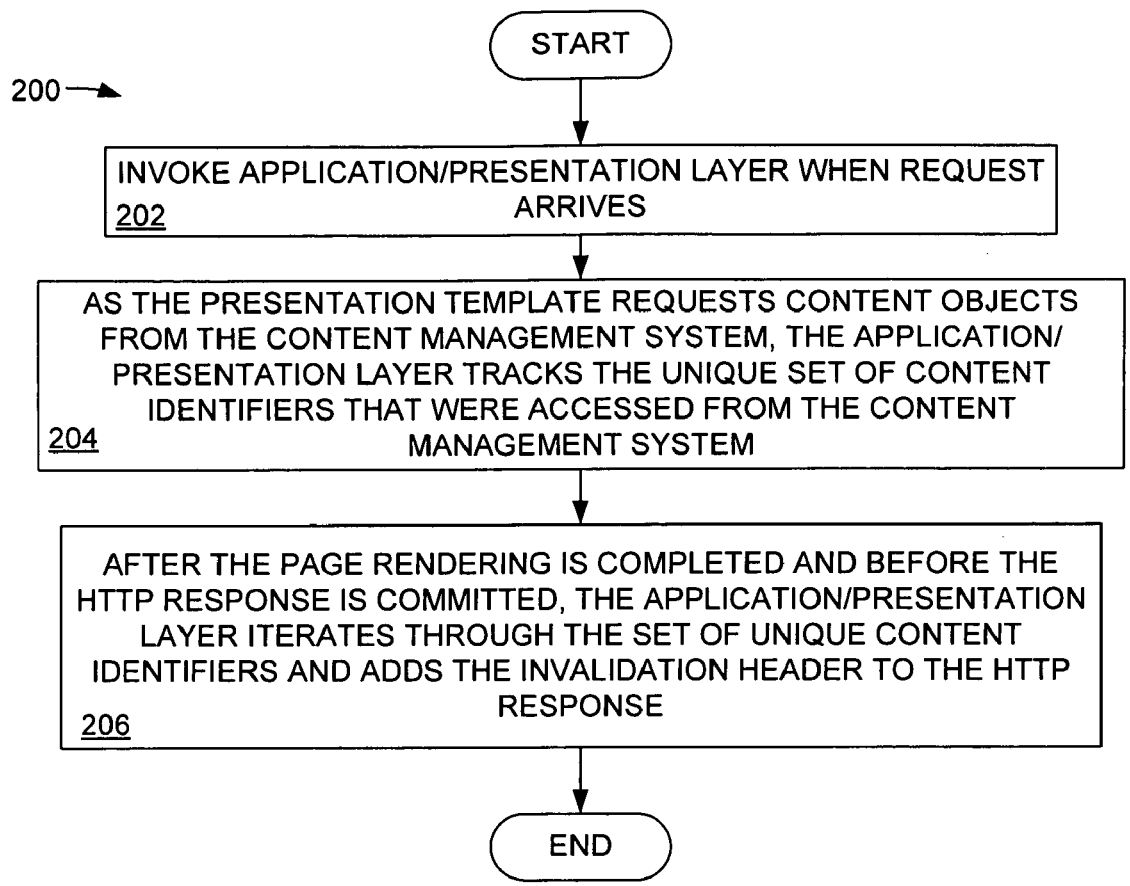
FIG. 2 is a flowchart illustrating an example of the creation by the application/presentation layer of an HTTP header that identifies all of the content contained within a rendered page.

FIG. 2 is a flowchart 200 illustrating an example of the creation by the application/presentation layer 116 of an HTTP header that identifies all of the content contained within a rendered page.

In block 202 the application/presentation layer 116 is invoked when a request for the web page arrives at the caching layer 124 over connection 136 and the caching layer 124 determines that it cannot serve a cached page 155 in response to the request due to the cached page being invalid due to having expired, outdated, or otherwise invalid content. The caching layer 124 invokes the application/presentation layer 116 by making the request of the application/presentation layer 116 over connection 126.

In block 204, as the application logic 117 in the application/presentation layer 116 requests content objects 160 from the content management system 110 over connection 118 so that it can render the requested page, the application/presentation layer 116 tracks the set of content identifiers 175 that identify the content objects 160 that are retrieved from the content management system 110.

In block 206, after the page 155 is rendered by the application/presentation layer 116, and before the HTTP response to the caching layer 124 is committed, the application/presentation layer 116 places the set of content identifiers 175 into an HTTP response header 120, also referred to herein as an invalidation header. The invalidation header 120 is included as part of the HTTP response provided over connection 128 to the caching layer 124.

The invalidation header 120 informs the caching layer 124 of the set of content objects 160 that are used to render a page. This information allows the caching layer 124 to update the map 165 that relates content identifiers with pages. The map 165 allows the caching layer 124 to process and interpret the content invalidation message 170.

Figure 3:
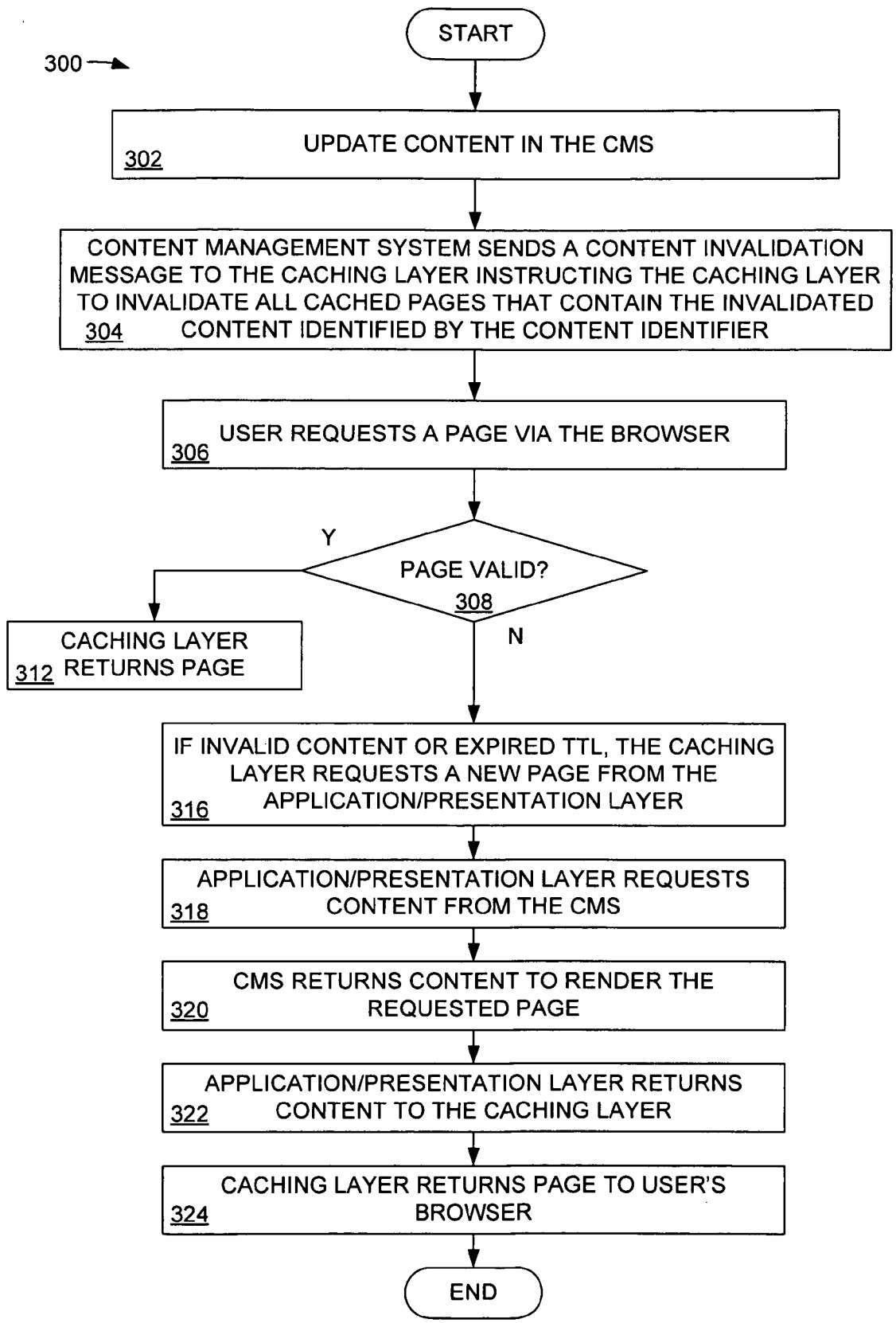
FIG. 3 is a flowchart illustrating the operation of an example of the caching of content associated with a rendered page.

FIG. 3 is a flowchart 300 illustrating the operation of an example of the caching of content associated with a rendered page.

In block 302, an editor 114 updates content 160 in the content management system 110 over connection 102. In block 304, the content management system 110 sends a content invalidation message 170 to the caching layer 124 over connection 119. The message can be, for example, an HTTP request containing XML. The content invalidation message instructs the caching layer 124 to invalidate all cached pages that contain the invalidated content as identified by the content identifier 175 in the content invalidation message 170.

In block 306, a user requests a page via the web browser 152. This occurs over connection 142 via the world wide web 134 and over connection 136 to the caching layer 124.

In block 308, the caching layer 124 determines whether the page 155, and therefore the request, is valid based on its record of content invalidation messages 170. In an alternative embodiment, the determination of whether the request is valid can also be made based on one or more TTL settings. If the requested page is valid, then, in block 312, the cached page is returned to the user via the browser 152. If, in block 308, it is determined that the requested page is not valid, i.e., that the requested page contains invalid or expired content, then, in block 316, the caching layer 124 requests updated content, an updated page, or a new page having updated content from the application/presentation layer 116. In block 318, the application/presentation layer 116 requests the desired new updated content from the content management system 110 over connection 118.

In block 320, the content management system 110 returns the content to the application/presentation layer 116 over connection 122, so that the page can be rendered.

In block 322, the application/presentation layer 116 returns the rendered page to the caching layer 124 over connection 128.

In block 324, the caching layer 124 returns the page to the web browser 152 over connections 138 and 144, so that the page can be viewed. In this manner, the page requested by the user is only rendered and cached as frequently as is necessary based on the frequency of updates to its content and based on the content invalidation messages described above. In an embodiment, the frequency with which a particular page is rendered and cached is determined by the frequency of updates to the content contained within the page and need not be based on an anticipated TTL value.

While various embodiments of the invention have been described, it will be apparent to those of ordinary skill in the art that many more embodiments and implementations are possible that are within the scope of the invention.

What is claimed is:

1. A system for refreshing cached content, comprising:
an application/presentation layer coupled to a content management system, wherein the application/presentation layer is configured to:
  generate page content based on a plurality of content objects retrieved from the content management system;
  determine a plurality of content identifiers based on the plurality of content objects, wherein each of the plurality of content identifiers corresponds to a respective one of the plurality of content objects; and
  insert an invalidation header including the plurality of content identifiers into the generated page content;
a caching layer operatively coupled to the application/presentation layer, and configured to:
  receive the generated page content containing the invalidation header from the application/presentation layer; and
  update a map of content identifiers to generated pages, based on the invalidation header;
wherein the content management system is configured to provide a content invalidation message to the caching layer in response to a content editor tool of the content management system updating a first object stored in the content management system, the content invalidation message including a first content identifier uniquely identifying the first content object, and
wherein the caching layer is configured to, upon receiving the content invalidation message, determine one or more cached pages that are invalid based on the included first content identifier, based on the map of content identifiers to generated pages.

2. The system of claim 1, in which the caching layer provides the cached content if it has no content invalidation message for any cached content.

3. The system of claim 1, in which if the caching layer has a content invalidation message for any cached content, the caching layer requests new content from the application presentation layer.

4. The system of claim 3, in which the application/presentation layer requests the new content from the content management system.

5. The system of claim 4, in which the application/presentation layer tracks a content identifier that identifies the new content delivered to the caching layer.

6. The system of claim 1, in which the content management system is configured to provide the content invalidation message upon query from the caching layer.

7. A method for refreshing cached content, comprising:
receiving a plurality of pages from an application/presentation layer, wherein the application/presentation layer is configured to generate the plurality of pages by, for each of the plurality of pages:
  generating the page based on a plurality of content objects retrieved from a content management system;
  determining a plurality of content identifiers based on the plurality of content objects, wherein each of the plurality of content identifiers corresponds to a respective one of the plurality of content objects; and
  inserting an invalidation header including the plurality of content identifiers into the generated page;
caching the plurality of pages in a caching layer;
maintaining a map of content identifiers to the plurality of pages, based on the invalidation headers in each of the plurality of pages;
receiving a content invalidation message generated in response to a content editor tool of the content management system updating a first content object stored in the content management system, wherein the content invalidation message includes a first content identifier uniquely identifying the first content object;
determining one or more invalid pages in the cached plurality of pages, based on the maintained map and further based on the first content identifier included in the content invalidation message; and
requesting updated content for each of the one or more invalid pages.

8. The method of claim 7, further comprising receiving the content invalidation message from the content management system, wherein the content invalidation message informs the caching layer when the content is updated.

9. The method of claim 7, further comprising providing the cached content in the absence of a content invalidation messages.

10. The method of claim 7, in which the cached content is a web page and a frequency with which the web page is rendered and cached is determined by the frequency of updates to the content contained within the web page.

11. The method of claim 10, in which the caching layer receives a content identifier that identifies new content delivered to the caching layer.

12. A non-transitory computer-readable medium storing a program which, when executed, performs an operation for refreshing cached content, comprising:
   receiving a plurality of pages from an application/presentation layer, wherein the application/presentation layer is configured to generate the plurality of pages by, for each of the plurality of pages:
      generating the page based on a plurality of content objects retrieved from a content management system;
      determining a plurality of content identifiers based on the plurality of content objects, wherein each of the plurality of content identifiers corresponds to a respective one of the plurality of content objects; and
      inserting an invalidation header including the plurality of content identifiers into the generated page;
   caching the plurality of pages in a caching layer;
   maintaining a map of content identifiers to the plurality of pages, based on the invalidation headers in each of the plurality of pages;
   receiving a content invalidation message generated in response to a content editor tool of the content management system updating a first content object stored in the content management system, wherein the content invalidation message includes a first content identifier uniquely identifying the first content object;
   determining one or more invalid pages in the cached plurality of pages, based on the maintained map and further based on the first content identifier included in the content invalidation message; and
   requesting updated content for each of the one or more invalid pages.

13. The non-transitory computer-readable medium of claim 12, wherein the content invalidation message is provided by the content management system, and wherein the content invalidation message informs the caching layer when the content is updated.

14. The non-transitory computer-readable medium of claim 12, in which the cached content is a web page and a frequency with which the web page is rendered and cached is determined by the frequency of updates to the content contained within the web page.

* * * * *

UNITED STATES PATENT AND TRADEMARK OFFICE
CERTIFICATE OF CORRECTION

PATENT NO. : 8,380,930 B2
APPLICATION NO. : 12/349262
DATED : February 19, 2013
INVENTOR(S) : Katz et al.

Page 1 of 1

It is certified that error appears in the above-identified patent and that said Letters Patent is hereby corrected as shown below:

In the Claims:

Column 5, Claim 1, Line 66, please insert --content-- after first;

Column 6, Claim 9, Lines 59-60, please delete "messages" and insert --message-- therefor.

Signed and Sealed this
Twenty-eighth Day of May, 2013

Teresa Stanek Rea
*Acting Director of the United States Patent and Trademark Office*